United States Patent [19]
Jelinek

[11] Patent Number: 5,384,698
[45] Date of Patent: Jan. 24, 1995

[54] STRUCTURED MULTIPLE-INPUT MULTIPLE-OUTPUT RATE-OPTIMAL CONTROLLER

[75] Inventor: Jan Jelinek, Plymouth, Minn.

[73] Assignee: Honeywell Inc., Minneapolis, Minn.

[21] Appl. No.: 938,071

[22] Filed: Aug. 31, 1992

[51] Int. Cl.$^6$ .................. G06F 15/46; G05B 13/04
[52] U.S. Cl. ............................. 364/149; 364/131; 364/152; 364/176; 364/166
[58] Field of Search ................ 364/148–151, 364/152–159, 160–166, 131–134, 138, 139, 176; 318/561

[56] References Cited

U.S. PATENT DOCUMENTS

| | | | |
|---|---|---|---|
| 4,500,950 | 2/1985 | Putman | 364/138 |
| 4,577,280 | 3/1986 | Putman | 364/148 X |
| 5,043,863 | 8/1991 | Bristol et al. | 364/151 X |
| 5,172,312 | 12/1992 | Iino et al. | 364/148 X |
| 5,191,521 | 3/1993 | Brosilow | 364/160 |
| 5,229,931 | 7/1993 | Takeshima et al. | 364/131 X |

FOREIGN PATENT DOCUMENTS 0128491 12/1984 European Pat. Off. .
0328678 8/1989 European Pat. Off. .
9106918 5/1991 WIPO .

OTHER PUBLICATIONS

M. Aldeen 'Class of Stabilising Decentralised Controllers for Interconneced Dynamocal Systems', pp. 125–134; Mar., 1992.
U. Ozguner, 'Decentralised and Distributed Control Approaches and Algorithms' p. 1293, left column, line 18–p. 1293, left column, line 32; FIG. 6; Dec. 1989.

Primary Examiner—Joseph Ruggiero
Attorney, Agent, or Firm—Paul H. McDowall; Michael B. Atlass

[57] ABSTRACT

A way of controlling a plant with multiple inputs and multiple outputs but allowing an operator to direct the control as if each controlled variable had a direct connection to operator controlled variables in described. An interference network cross fertilizes information from multiple subcontrollers amongst themselves, to allow for enhanced control based on user defined criterion.

20 Claims, 5 Drawing Sheets

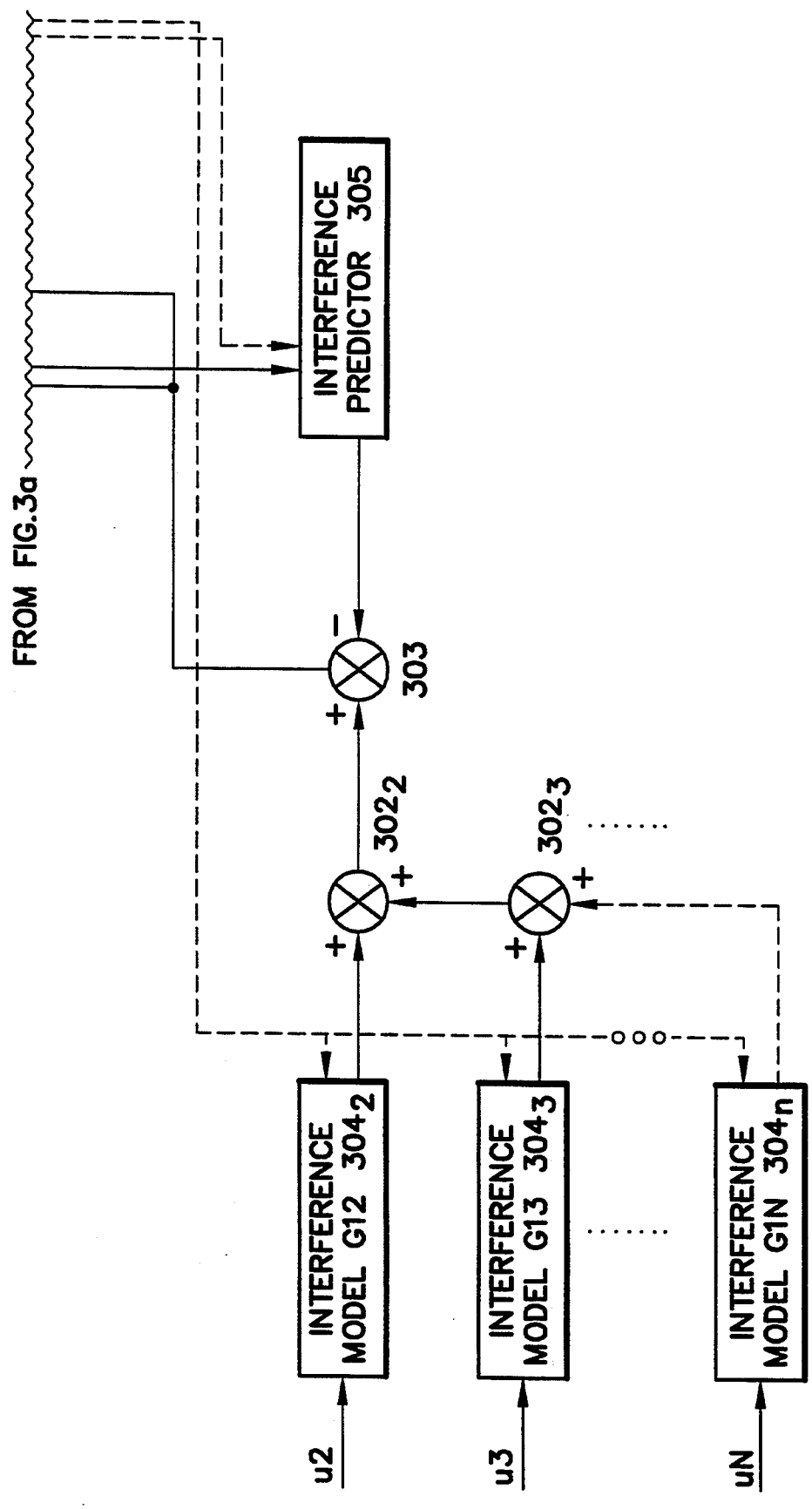

STRUCTURED MULTIPLE-INPUT MULTIPLE-OUTPUT RATE-OPTIMAL CONTROLLER

BACKGROUND OF THE INVENTION

This invention relates to system or process controllers and more specifically to nonlinear, time-variable predictive controllers in general, and particularly those based on Rate Optimal Control (hereinafter ROC). This will enhance operator control because each plant output will appear to be effectively controlled by an individual setpoint. Moreover, this invention teaches a unified and systematic approach to building robust high-performance control systems that can involve hundreds of control loops exhibiting mutual coupling.

Previously, there have been two approaches to designing control systems. The first approach, called the conventional approach, designs a control system incrementally from the bottom up. Starting with individual loops, each process variable is assigned a closed loop driven by a single input single output (SISO) controller, whose set point represented the desired value of the variable. Due to physical interactions between process variables, these loops are not independent of each other. Failure to account for this mutual coupling degrades overall controller performance, and thus, system performance. To reduce these coupling effects, feedforward links and cascade loops are added on an ad hoc basis after the first design pass. This procedure often needs to be repeated several times to achieve satisfactory system behavior. Moreover, considerable control expertise and in-depth knowledge of the controlled process are required to use this approach.

The second approach to control system design is based on modern control theory which suggests there is, and supplies an exact theoretical solution to the design problem. Using this approach, the plant that the controller is being designed for, can be treated as a multiple input multiple output (MIMO) system which allows all of the characteristics of the process variables to be determined. This "text-book" approach however, has not yet been commercially viable because it does not meet several important engineering criteria. First, for plants with hundreds of process variables, the design algorithms are computationally intractable on current hardware. Secondly a controller based on this approach cannot be developed incrementally, nor does it support modular design or distributed architectures.

SUMMARY OF THE INVENTION

This invention combines the benefits of the modern and conventional approach. First, it approaches the expected control performance and robustness of that which may be achieved with a true MIMO optimal controller designed under the modern approach. Second, it provides an internal structure that allows the user to control a plant (or other controlled system) in ways not possible with a true MIMO. This internal structure also allows for user specified limits on plant variables. Moreover, the controller taught here can be developed incrementally while remaining modular and computationally distributed. Finally, this invention allows a controller to use various sampling rates, thus giving greater computation efficiency. (The sampling rates should be settable by a user or automatically set to best match the requirements of the process under control.)

The invention is a structured multiple input multiple output (abbrieviated SMIMO) rate optimal controller (ROC) which consists of several multiple input single output (called MISO) ROCs and a network to allow one MISO subsystem to communicate and coordinate with one or more other MISO subsystems. It should be noted that the MISO incorporates the predictive control strategy set forth in copending patent application filed Dec. 23, 1991 (Jan Jelinek, 07/814307).

The SMIMO of this invention can operate in a ratio constrained mode to further ensure that user defined limits will not be violated. For example, a plant controlled by this invention can have several process variables $(Y_1, Y_2, \ldots, Y_N)$ that are controlled so that their ratios $(Y_1(t):Y_2(t): \ldots :Y_N(t))$ are constant for all times (t). This is preferably accomplished by designating one of the variables as a master while the others variables are designated as slave. In the presently preferred embodiment, the selection of the master variable is arbitrary and is a matter of convenience in a given application. For example, in boiler control, the fuel flow variable can be designated as the master value, whereas forced and induced drafts are designated as slave variables.

BRIEF DESCRIPTION OF THE DRAWING

FIGS. 3a and 3b constitute is a block diagram of a Multiple Input Single Output Rate Optimal Controller in accord with a preferred embodiment of the invention.

DESCRIPTION OF THE PREFERRED EMBODIMENT

Figure 1:
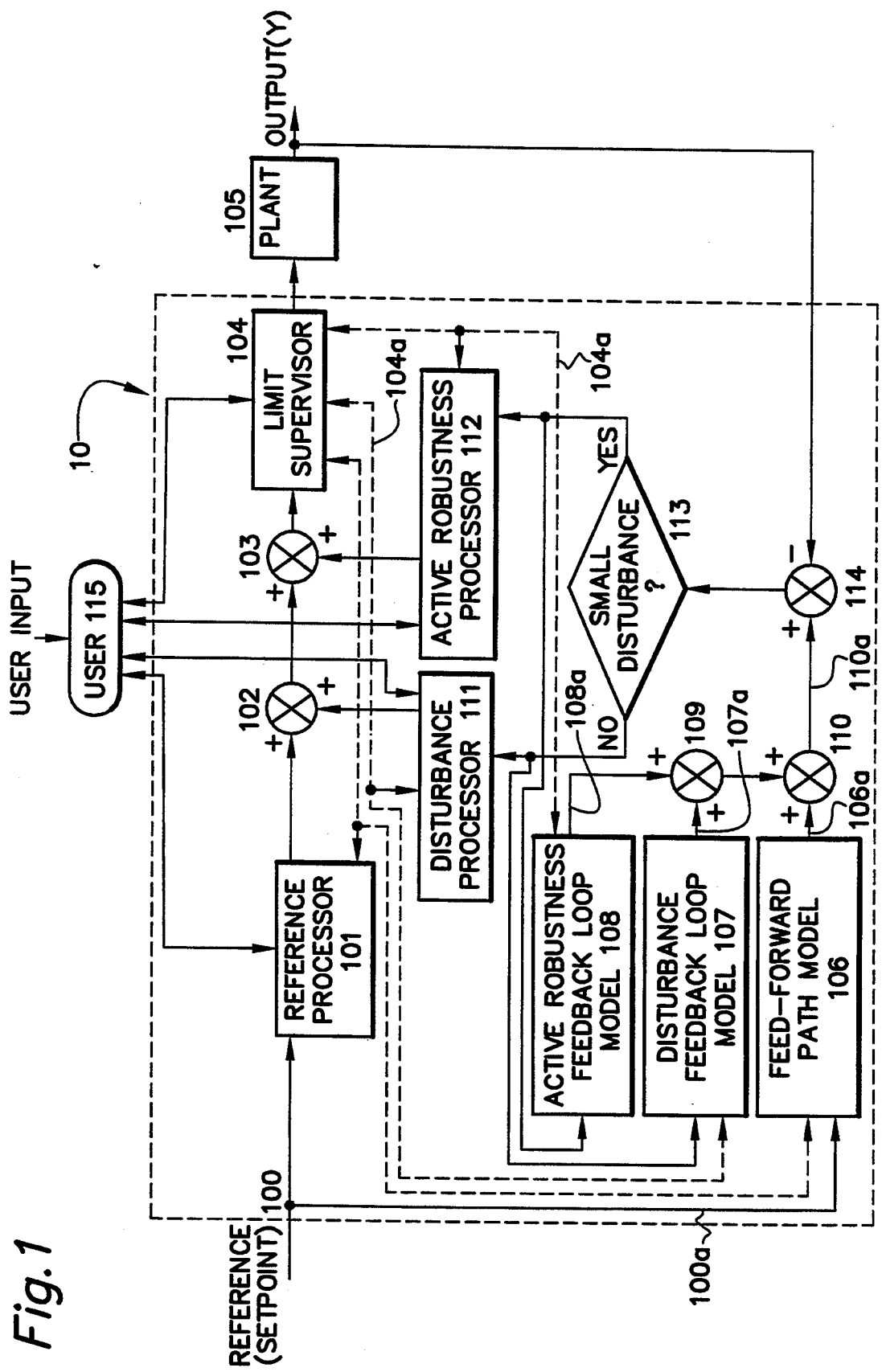
FIG. 1 is a block diagram of a Single Input Single Output Rate Optimal Controller.

FIG. 1 is a block diagram of one embodiment of a SISO ROC 10 as described in copending U.S. patent application Ser. No. 07/814307 (Jelinek). This embodiment has: a user controlled reference input 100, a reference processor 101 that generates a sequence of plant control signals, an adder 102 that combines the reference processor control sequence with the disturbance processor control sequence and another adder 103 that combines the control sequence from 102 with the active robustness control sequence from 112. The output of adder 103 is sent to the limit supervisor 104 that ensures the control sequence received from 103 does not violate any user defined limitations and then sends that supervised sequence to a plant 105. If the limit supervisor 104 alters the received control sequence, it will signal this information to the disturbance processor 111, the active robustness processor 112, the active robustness feedback loop model 108 and the disturbance feedback loop model 107 of the corrections that were made (line 104a). The plant output y is forwarded to subtractor 114. A feedforward path model 106 also receives the reference input (line 100a) and generates the expected plant output. The output of model 106 is combined with the sum (109) of the outputs (108a and 107a) of a disturbance feedback loop model 107 for generating the expected disturbance and an active robustness feedback loop model 108 for generating the expected active robustness disturbance. This is done by adder 109 which combines the expected active robustness disturbance and the expected disturbance together. Another adder 110 combines the resultant signals from adder 109 to the expected plant output (106a). A subtractor 114 adder generates the signal representing the difference between the expected (110a) and actual (y) plant output. A switching or other decision device 113 determines whether the error is large or not, and sends a signal representing the value of large errors to the disturbance processor 111 and disturbance feedback loop model 107 and a signal representing the value of small errors to the active robustness processor 112 and the active robustness feedback loop 108. The disturbance processor 111 generates a sequence of corrections based on its input and sends them to adder 102. The active robustness processor 112 also generates a sequence of corrections based on its inputs and sends its corrections to adder 103. It should be noted that any or all of these processors may be implemented in hardware Or software. A user input device 115 is provided to allow the user (or automatic tuner) to alter the control laws, operating limits and other parameters of this controller's processors, models and supervisor. Note that the solid lines in FIG. 1 generally denote control signal paths, and the dotted lines connecting processors or the limit supervisor indicate pathways for data, process, or control information. Note also that these pathways and processors may be implemented in hardware or by software configuration of a general purpose computer system. Methods and devices for implementation of the adders and subtractors are well known, both for analog and digital signals. The processors are commonly known as implementable by performing equations which describe their function and are generally well known.

It should be noted that all the processors use the predictive control correction procedure described in copending Patent Application No. 07/814307. One embodiment of this procedure is set forth briefly as follows.

1) Predict the current output sequence. Using the past and precomputed future values of the current control sequence:

$$u^0(k-d), \ldots, \ldots, u^0(k), \ldots u^0(k+P-1) \quad (2.1)$$

where k is the current sampling instant,

P >= P₀ P is an integer called the prediction horizon whose minimum length P₀ is determined by an optimization algorithm in Step 4 (which must be precomputed at start up), d >= 0 d is the plant transportation delay (if any) and a model of the plant under control, and $$y^0(k+1), \ldots, y^0(k+P+d) \quad (2.2)$$

computes the future values of the current output sequence

2) Compute the desired output sequence.

Using the current output y(k), the reference change value $r^k$ and the adopted control law (fixed rate, fixed duration or other user defined law), compute the future desired output sequence.

$$y(k+1), \ldots, y(k+P+d) \quad (2.3)$$

where: y(n) is the desired output sequence generated in step 2.

3) Determine the ideal correction output sequence as follows.

$$y^k(n-k) = y(n) - y^0(n) \quad n=k+1, \ldots, k+P+d \quad (2.4)$$

where: $y^0(n)$ is the computed future value output sequence from step 1.

(Note that $y^k(0)=0$ because $y(k)=y^0(k)$.).

4) Find the correction control sequence.

Find $u^k(n), n=0,1, \ldots$ so that the following three criteria are met:

a) The sub-sequence $y^k(n), n=0,1, \ldots, P-1$ minimizes the performance criterion (J) as follows:

$$J(u^k(0), \ldots, u^k(P-1)) = \quad (2.5)$$

$$(1-w) \sum_{i=1}^{P} (Y_A{}^K(i+d) - Y^K(i+d))^2 +$$

$$w \sum_{i=0}^{P-1} (\Delta U^K(i))^2$$

where $$y_A{}^k(n) = \sum_{i=0}^{n} h(i) u^k(n-i) \quad (2.6)$$

is the actual (A) instead of the ideal correction output sequence, $h(n), n=0,1 \ldots$ is the plant model impulse response, $$\Delta u^k(n) = u^k(n) - u^k(n-1), \, n=0,1, \ldots \text{ with}$$
$$u^k(-1)=0 \quad (2.7)$$

where $0 <= w <= 1$ is a trade off between the accuracy of following the ideal correction output sequence and its cost in terms of the control signal smoothness.

Note that because the stability issues in 4c (below) are separated from the criterion formulation (2.5), any choice for the value of w, will lead to a stable correction. If w=0, then the best approximation of the ideal correction output is found, resulting in the best control quality. However, the cost in terms of large and possibly irregular oscillating control actions can be substantial, particularly for short prediction horizons. On the other hand, for w=1, the correction control sequence is the smoothest possible, letting the plant make the smoothest transition and reach the steady state in P steps. By choosing a value between 0 and 1 the user can set a trade-off between the control quality and the actuator stress depending on what value is best suited for a given application.

It should be noted that J can be any criterion equation selected by the user as optimal. Such equations may be, for example, the minimum integral square error, minimum integral absolute error, or others, as is well known to those of ordinary skill in the art. However, we currently prefer the use of the criterion equation 2.5.

b) The sequence $u^k(n), n=0,1, \ldots$ produces a P-step deadbeat output sequence. This process output sequence is $y^k{}_A(n), n=0,1, \ldots$ with $$y^k{}_A(n) = y^k(P+d) \text{ for all } n \geq P+d \quad (2.8)$$

P-step deadbeat means that the plant will remain stable after leaving the prediction horizon.

c) The sequence $u^k(n), n=0,1, \ldots$ can be thought of as being generated by a stabilizing controller for the given plant in response to the step reference change $r^k(n)=r^k, n=0,1,\ldots$. It implies that $y^k_A(n)$, $n=0,1,\ldots$ can be interpreted as the step response of a closed loop driven stably by a linear controller.

5) Correct the current control sequence. Compute the correct control sequence $$u(k+n)=u^0(k+n)+u^k(n), \ n=0,1, \qquad (2.9)$$

6) Apply the current control value $u(k)$ to the network plant or summation means.

7) Proceed to the next sampling instant as follows. Set $$u^0(n)=u(n), n=k, k+1, \qquad (2.10)$$

Then proceed to the next sampling instant $(k+1)$ where the above described procedure is repeated.

The above seven-step formulation of predictive control differs from other known schemes in several respects including control stability. If we assume that equation (2.1) is a sub-sequence of the current control sequence which provides a stable control of a given plant, then the current and future values, $u^0(k)$ $u^0(k+1)$, ..., in (2.1) would have been generated by the predictive controller if there was no reference change at times $k, k+1, \ldots$. The output sequence (2.2) is called the closed loop prediction. The underlying assumption implies that the predictive controller as it existed at time k would guarantee a closed loop which is stable both internally and externally. (Internal stability means that the controller itself will not produce unstable control sequences. While external stability means that the controller will keep the plant stable, not necessarily by means of a stable control sequence.) The correction procedure will not destroy this stability, because this procedure, the seven step formulation above, corrects the current control sequence by adding a correction control sequence which is by design stable regardless of the plant stability status primarily because of step 4c. The closed loop response will also remain stable after the predictive controller behavior has been modified.

This is different from most predictive schemes in which equation (2.1) is replaced by the open loop prediction in which future control values are set to the current controller output value $u(k)$:

$$u^0(n)=u^0(k), \ n>k$$

This would mean that the predicted current output sequence (2.2) would become the plant step response executed with nonzero initial conditions. If the plant is unstable, even a stable correction based on this prediction could destabilize the closed loop. Consequently, none of the popular predictive control schemes previously known are able to provide provably stable control for an arbitrary unstable plant.

The closed loop prediction method employed by this invention is costly in at least one way. In the presently preferred embodiment of the invention, the future values of the current control sequence must be stored and updated at every sampling instant. An open loop predictive system, on the other hand, does not need to recompute the entire control sequence.

This leads to the question of just how many future values need to be maintained at any given instant. Although the sub-sequence (2.1) at any instant makes use of only $(P-1)$ future values, this "window" of sampling instants is constantly moving forward in time. Consequently, the correction (2.9) calls for updating the control sequence to infinity. One solution implemented in the presently preferred embodiment, is to require the correction sequence to reach a steady-state after a finite (and preferably small) number of sampling instants. Once the initial transient is exhausted, the same steady-state value is used from that instant forward. Because this requirement is independent of the conditions listed in Step 4, we will now add it here as step "4d";

d. The sequence $u^k(n)$, $n=0,1,\ldots$ is P-step Deadbeat

This means that $u^k(i)=u^k(P)$ for all $i>=P(2.11)$ It is preferred to consider this requirement an option. This option is a particularly important one to use given the fact that (2.11) can produce unsatisfactory closed loop responses for some plants. Alternate formulations not insisting on P-step deadbeatness are possible but we shall not explore them here.

It is important to note another difference between previously known predictive schemes and this invention's procedure. That is the condition set forth in 4c. Requiring the corrective sequence at any instant k to be, in principle, producible by a linear feedback controller does not imply that the resulting predictive controller is linear. The constraint merely confines the search for solutions of the optimization problem (2.5) to all possible stable controls of the given plant.

Predictive schemes generally use approximately deadbeat corrections to ensure the correction response (the plant output) does not become wild as soon as it leaves the prediction horizon. This is accomplished by tuning the controller parameters, particularly the length of the prediction horizon. In this invention, the deadbeatness of the correction output sequence is explicitly required and is detached from stability. As a result, stability is not related to the length of the prediction horizon which can be chosen arbitrarily to meet the fixed rate or fixed duration law. The requirement of the correction output sequence being deadbeat can be relaxed and an alternative may be used, but it shall not be explored in detail here.

The SISO ROC can be used to control any stable or unstable plant, with or without transportation delay. In the preferred embodiment the rate and duration are on-line parameters very much like the reference, and can be changed at any time. This allows the user to determine the way a state will be reached in real time.

A supervisory or data sharing system can also be implemented to oversee the operation of the controller. Various operations of the controller can be overseen in different ways. First, in each of the processors, a supervisor can check each sequence value to make sure that no user defined criteria has been violated. For example, if one of the elements of a sequence violates a user defined upper limit, the supervisor can scale the entire sequence down, so that the individual control value will no longer be in violation. Secondly, a supervisor can also be employed to monitor the change of a control value from one sequence to the next. This is done to ensure that no user defined limit on the rate of change of the manipulated variable will be exceeded.

Supervisory functions can also be employed to assure that the combination of signals from the reference and disturbance processor will not cause the plant to exceed the user defined values or rates. If the combination of the two sequences will cause the plant to exceed the user defined limits, each element of the combination of the two sequences that is sent to the plant can be scaled down by the same factor, until the excessive situation is corrected. Note that a simple clamping of those control values that exceed the limits may be considered for predictive control algorithms, however, it is not preferred here because it may turn an originally stabilizing control sequence into a destabilizing one.

Figure 2:
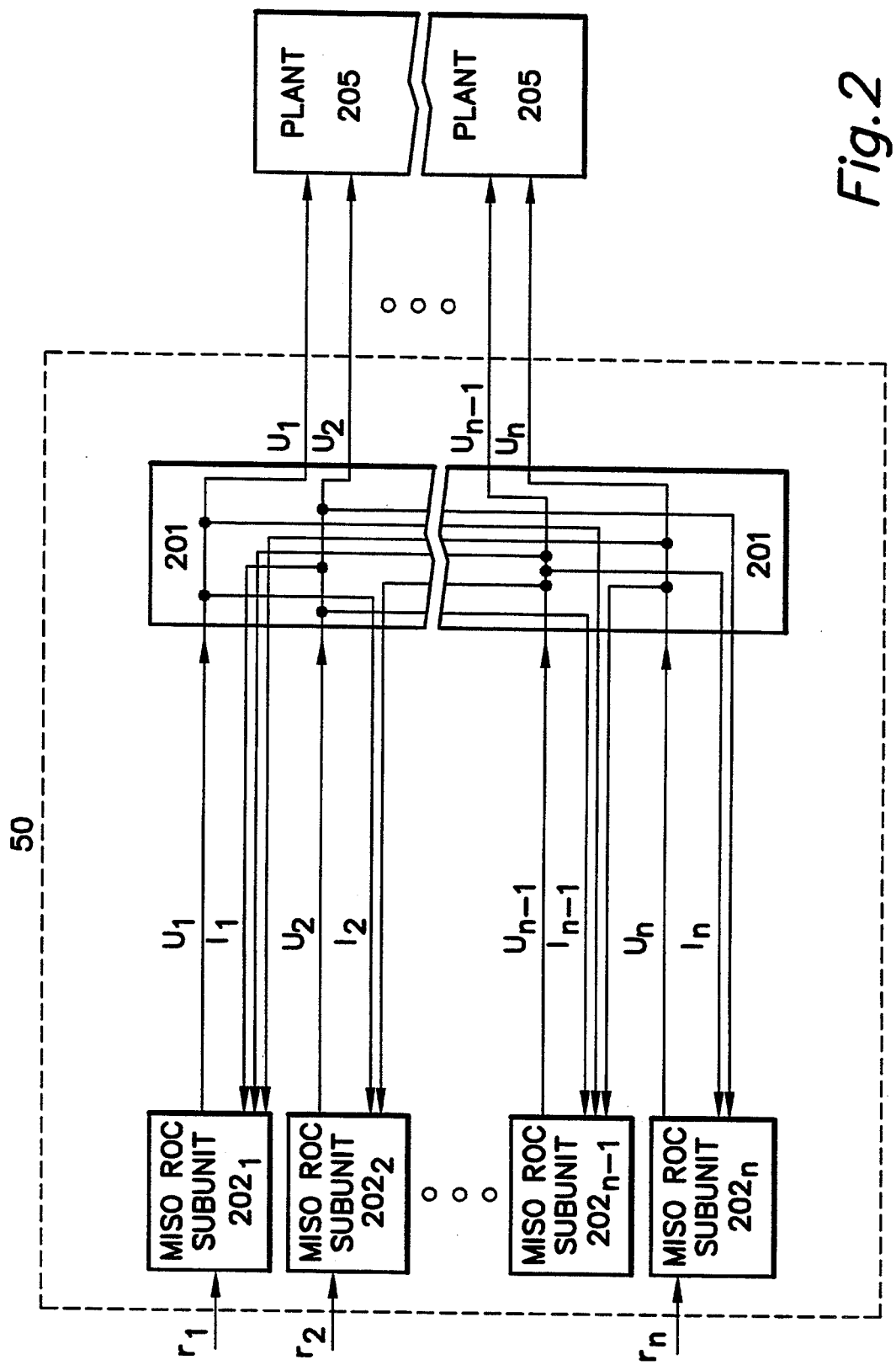
FIG. 2 is a block diagram of a Structured Multiple Input Multiple Output Rate Optimal Controller in accord with a preferred embodiment of the invention.

FIG. 2 depicts the one embodiment of the SMIMO ROC controller 50. A plant 205 can be controlled by a SMIMO ROC controller 50 which consists of an interconnection network 201 and several MISO ROC subunits $202_1 \ldots 202_n$ which are further illustrated in FIG. 3 (a subunit may be called a subcontroller). Because each MISO ROC 202 produces one control sequence, $u_1 \ldots u_n$, there are as many MISO ROC subunits as there are plant inputs. Each MISO ROC is considered responsible for one particular plant output (i.e., process variable such as $y_1 \ldots y_n$), and its reference ($r_1 \ldots r_n$) specifies the desired value for this plant output. However, because of the mutual coupling among plant variables, the control sequences generated by a MISO ROC subunit $202_1 \ldots 202_n$ will typically act on more than one plant output. Therefore, it is up to the user to decide which subunit $202_1 \ldots 202_n$ will be responsible for a particular plant output. The relationship between a subunit $202_1 \ldots 202_n$ and its selected plant output is called a dominant relationship. Thus, a dominant relationship exists between the plant input which is driven by a given MISO ROC subunit $202_1 \ldots 202_n$, and the plant output assigned to its reference input. As aforesaid, most plants exhibit coupling between variables. This means that a plant input will generally affect more than one output. The coupling between an input and the affected output other than the dominant one is called interfering. All of these relationships between process variables can be modeled by transfer functions. The pairing of dominant outputs with plant inputs is an arbitrary procedure that is well known to those of ordinary skill in the art. In the preferred embodiment, the best results are obtained when the outputs having the largest gains and short transportation delays with respect to their inputs are chosen to be the dominant outputs.

Once the interconnection network 201 receives control sequences from each MISO ROC subunit 202, it directs each control sequence to the proper input of the controlled plant 205 and also to the proper input of each MISO ROC 202 designated to receive the signal. Generally, most if not all plant inputs will affect each plant output. This would suggest that each MISO ROC $202_1 \ldots n$ should receive the output of all the other MISO ROC subunits $202_1 \ldots n$ (denoted as inputs $I_x$). Although this would work, the preferred embodiment will still give good performance even if the outputs from only a few of the strongest interfering signals ($U_x$) are received through the interconnection network 201. It should be noted that FIG. 2 shows an example of a possible interconnection network. (A more detailed explanation of $U_x$ signals is given with reference to FIG. 4.)

While in operation, as will be discussed in FIG. 3, the SMIMO ROC 50 decouples interacting variables which give the illusion that the plant is a collection of independent SISO subplants, each independently controlled by a single MISO controller.

It should be noted that the SMIMO ROC controller 50, or any of it subcomponents, may be constructed by causing a computer to proceed step by step through the above-described process. Such a construction can be called a software processor. These processors can alternatively be constructed in hardware, or some combination of hardware or software, as is well known to practitioners of the relevant art. The choice of construction should depend on considerations of economy.

Figure 3A:
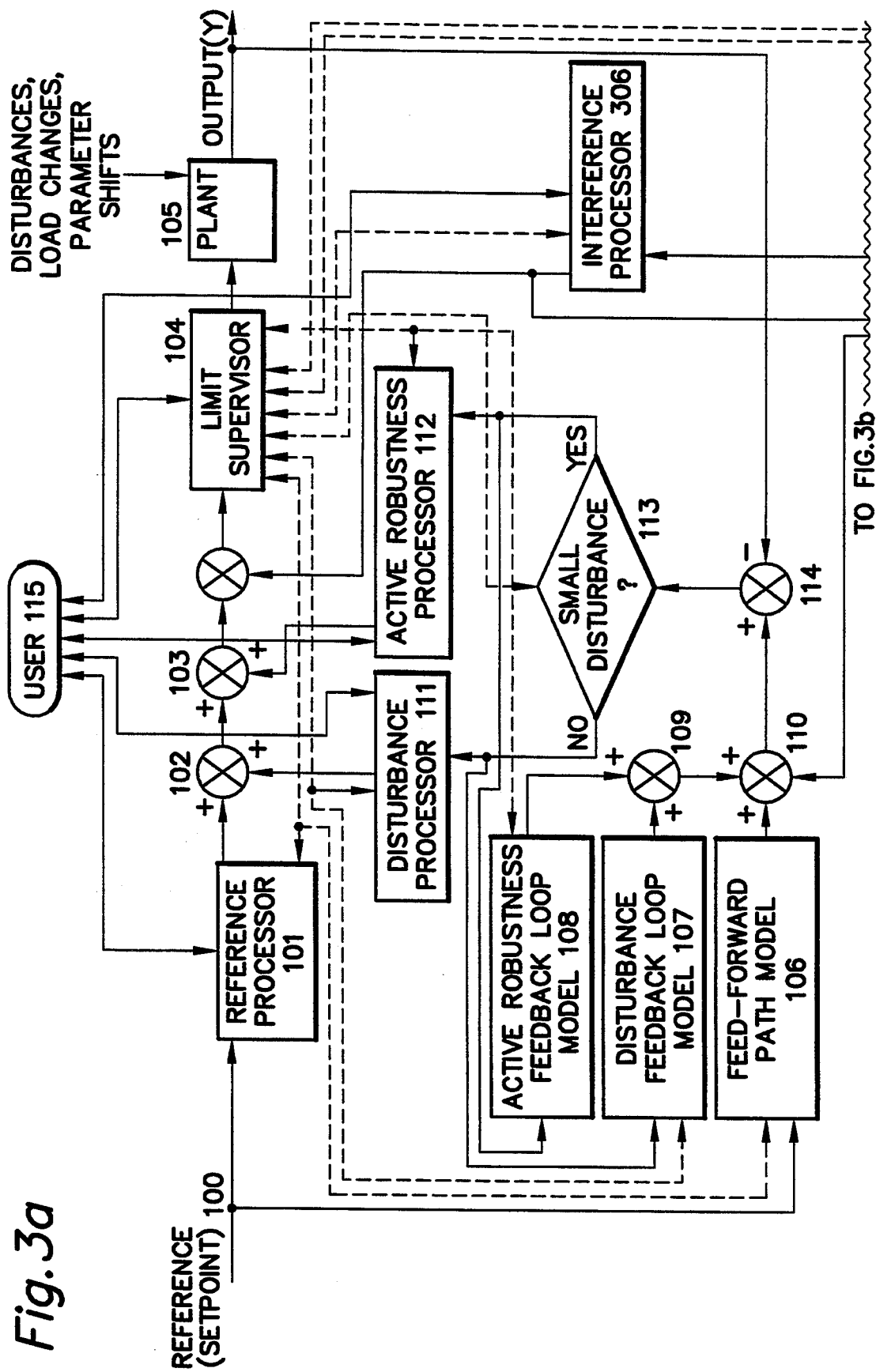

FIG. 3 is a block diagram of a MISO ROC subunit 202. It is identical to the SISO shown in FIG. 1 except that several components have been added to compensate for the interfering effects other MISO controllers have on the controlled process variables. These components include interference models $304_2 \ldots n$ for receiving control sequences from the interconnection network and compute the interfering affect said control sequence will have on the process variable controlled by MISO 202. Adders $302_2 \ldots n-1$ are used to perform element-wise addition on the control sequences from the interference models $304_2 \ldots n$. The difference between the actual interference in a given time period and the predicted interference is determined by subtractor 303. Subtractor 303 takes the control sequence from interference predictor 305 (described below) and subtracts from it the summed control sequence from all of the interference models 304.

The difference signal generated by subtractor 303 is sent to two places, adder (or summer) 110 and interference processor 306. The control sequence sent from subtractor 303 to adder 110 to ensures that the disturbance processor will not process any disturbances caused by a difference between the actual interference experienced by MISO 202 and that computed by the interference predictor 305.

Interference processor 306 also receives the control sequence generated by subtractor 303. Based on the received control sequence, interference processor 306, utilizing the procedure described in FIG. 1, generates a control sequence that cancels the interference caused by other MISOS 202, out of the process variable under control of MISO 202. Once this control sequence is generated, it is sent to adder 301, where it is added to the control sequence generated by adder 103. This signal is then sent to limit supervisor 104 when added with the output of interference processor 306 (at adder 603).

Interference predictor 305 also receives the control sequence generated by interference processor 306. Based on the received control sequence, interference predictor 305 generates a control sequence that is a prediction of the interference expected from other MISOs at the next time instants. It should be noted that the interference model 304, predictor 305 and processor 306, all use the predictive control strategy in set forth in 07/814307 which was also briefly described in FIG. 1.

Figure 4:
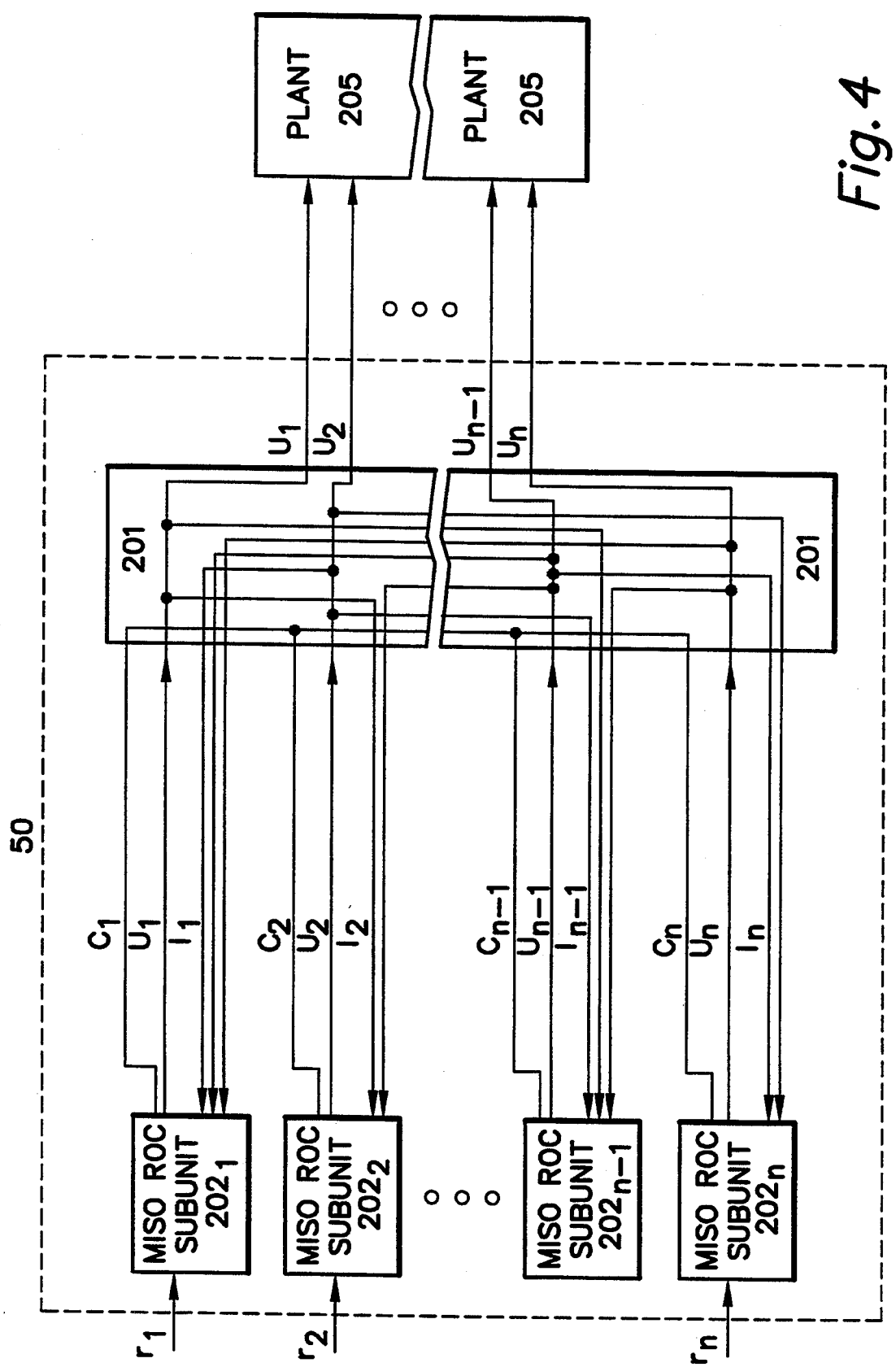
FIG. 4 is a block diagram of a Ratio Multiple Input Multiple Output Rate Optimal Controller in accord with a preferred embodiment of the invention.

FIG. 4 is a diagram of a Ratio Multiple Input Multiple Output Rate Optimal Controller (RMIMO ROC). This is similar to the structure described in FIG. 2, except that control and coordination information is also passed through the interconnection network 201 to each MISO ROC $202_n$ that may require the information. This information is sent and received by the supervisor. This connection is shown by $C_1 \ldots n$. Here again, as we saw in FIG. 2, signals $U_x$ are returned to each subcontroller. $U_x$ may be $U_1 \ldots U_n$, or any combination of these control signals from the subcontrollers. Note that $U_x$ contains the same information as $C_1 \ldots C_n$ returned to $202_1 \ldots n$. Therefore, the subcontrollers 202 could use this information without the benefit of the "C" inputs, if they have more internal intelligence/capacity. At the present time, it is preferred to send back these $U_x$ signals with the $C_1 \ldots C_n$ signals but as it can be seen, this is not required.

Execution proceeds in two phases. In the first phase, after all the MISO ROCs have finished computing their desired control corrections, each one checks the corrections to see if they meet the user defined constraints defined for that particular MISO. As described in FIG. 1 if a MISO ROC finds out that its desired correction is going to violate the constraints, it scales down its correction accordingly so as to avoid the violation. These scaling factors are then broadcast throughout network 201 to MISOs $202_n$. In the second phase, each MISO picks the minimum scaling factor, as the actual factor and applies it to produce the actual control sequence. Because the minimum factor is the same for all MISO ROCs $202_n$, all of them will scale their controls in the same proportion, thus maintaining the desired ratios. The predictive ROC algorithm employed by the MISO ROCs guarantees that the desired ratios are kept at every sampling instant, regardless of whether the closed loop is in a steady state or in a transient state.

If one or more MISO ROCs $202_n$ are limited by constraints, all MISO ROCs $202_n$ are forced to reduce their control sequences by the shared scaling factor. If no manipulated or process variable reaches its upper or lower limit within the prediction horizon, the controller will drive the plant at the user specified rate.

Furthermore, in an alternate embodiment, the user can select a specific MISO to act as a constraint on the remaining MISO ROCs $202n$. This is accomplished by limiting the corrections of other MISOs $202_n$ by the output and setpoint of a user selected MISO ROC $202n$. In this case, the user selected MISO $202n$ is called the "master" and the other MISOs 202 receiving its scaling signals are called "slaves". This embodiment thus allows an entire plant 205 to be controlled by the setpoint of one MISO ROC $202n$. It should also be noted that groups of MISO ROCs $202n$ can be placed in user defined groups in which each group has a master and possibly one or more slaves.

After selecting the master and slave control variables, the user then must only specify the set point and control law for the master and the control laws for the slaves. Because each slave is characterized only by its ratio, r, relative to the master, which completely determines its behavior, the slaves are not given any specific set point. The master variable's set point, rate/duration and the slave variables' ratios are all parameters which the user is free to change at anytime without retuning the controller. Even which variable is chosen as the master may easily be changed if desired.

Many ways to construct this invention will occur to the reader, but this application is only limited by the following appended claims.

I claim:

1. A computer system operable as a predictive controller unit for controlling a plant and connected to said plant either through direct electronic or optical link or via human machine interface comprising:

at least two subcontrollers for generating and outputting control signals, each said subcontroller having at least three inputs, namely a reference input for receiving a reference signal, an error signal input for receiving error signals from the controlled plant, and an interference input for receiving interference signals $U_x$; and, an interconnection means for receiving said control signals from said at least two subcontrollers having an input for receiving a control signal output from said subcontrollers and having an interference output for sending said subcontroller output signals to said subcontrollers as interference signals, and having a control output for sending control signals to the plant under control.

2. A controller unit according to claim 1 wherein said subcontroller generated control signals consist of a sequence of control signals.

3. A controller unit according to claim 1 wherein said interference input consists of a sequence of interference input signals.

4. A controller unit according to claim 1 wherein said subcontrollers has an additional output for sending scaling factor information to the network.

5. A controller unit according to claim 1 wherein said subcontrollers has an additional input for receiving scaling factor information from the network.

6. A controller unit according to claim 1 wherein said subcontrollers is able to reduce the outputted control signal by a value representative of a scaling factor received from the interconnection network.

7. A controller unit according to claim 1 wherein said interconnection means has inputs for receiving scaling factor information from each subcontroller.

8. A controller unit according to claim 1 wherein said interconnection means has outputs for sending scaling factor information to each subcontroller.

9. A controller unit according to claim 1 wherein said interconnection means has inputs for receiving scaling factor information from each subcontroller and outputs for sending said scaling factor information to each subcontroller.

10. A controller unit according to claim 9 wherein a user determines which said interconnection means inputs are outputted.

11. A controller unit according to claim 9 wherein said interconnection means further comprises a sorting device which determines the right scaling factor to send to all controllers based on predetermined criteria.

12. A method for controlling a plant using a controller unit comprising the steps of:

(A) first:
      (i) defining a reference model for each said controller means, which identifies the variable being controlled, and
      (ii) selecting either a user defined control law for the reference processor, disturbance processor and interference processor or a global law for all three processors.

(B) then in any order:
      (i) allowing the user to adjust the setpoint for each controller means,
      (ii) generating a baseline reference control signal ($U_R$) thru a processor means obeying said control law,
      (iii) generating a disturbance corrective signal. ($U_D$) through a processor means based on the deviation between the output from the plant and the expected output as generated by the reference model, but not including disturbances which have already had a corrective signal generated for them,
      (iv) generating an interference corrective signal $U_I$ through a processor means based on the effect the other controllers have on the process under control, but not including outputs that have already had a corrective signal generated for them, (C) then combining $U_R$, $U_D$ and $U_I$ to produce a control signal for the controlled variable so that the control law(s) are not violated, (D) then, (i) transmitting the control signal to the variable under control, and (ii) transmitting the control signal to those said controllers with which the control signal interferes.

13. A method for controlling a plant using a controller comprising the steps of:

(A) first:
(i) defining a reference model for each said controller means, which identifies the variable being controlled, and
(ii) selecting a user defined control law for the reference processor, disturbance processor and interference processor or a global law for all controller means.

(B) then in any order:
(i) allowing the user to adjust the setpoint for each controller means,
(ii) generating a baseline reference control signal ($U_R$) in each controlling means thru a processor means obeying said control law,
(iii) generating a disturbance corrective signal ($U_D$) in each controlling means through a processor means based on the deviation between the output from the plant and the expected output as generated by the reference model, but not including disturbances which have already had a corrective signal generated for them,
(iv) generating an interference corrective signal ($U_I$) in each controlling means through a processor means based on the effect the other controllers have on the process under control, but not including outputs that have already had a corrective signal generated for them, (C) scaling $U_R$, $U_D$ and $U_I$ in each controlling means to produce a control signal for the controlled variable so that the control law(s) are not violated, (D) transmitting the scaled factor in each controlling means to all other controlling means, (E) Reducing the combined signals of $U_R$, $U_D$ and $U_I$ by the smallest scaled factor, (F) then,
(i) transmitting the control signal to the variable under control, and
(ii) transmitting the control signal to those said controlling means that the control signal interferes with.

14. A controller unit for controlling a plant comprising, a reference processor having a reference input means for receiving a reference signal and then generating a baseline control signal which can bring said plant into a desired state along a definite user defined path, a reference model for generating and outputting a signal representing the expected output of said plant at any instant along said path, a disturbance processor having an input for receiving error signals and then generating an of corrective control signals, an interference processor having inputs from other controller outputs and then generating an output of corrective control signals, each of said processors having an operating mode which is user defined, and a means for coordinating the operation of said processors.

15. A controller unit for controlling a plant comprising, a reference processor having a reference input means for receiving a reference signal and generating a sequence of baseline control signals which can bring said plant into a desired state along a definite user defined path, a reference model for generating and outputting a sequence of signals representing the expected output of said plant at any instant along said path, a disturbance processor having an input for receiving a sequence of error signals and generating an output of a sequence of corrective control signals, an interference processor having inputs from other controller outputs and generating an output of a sequence of corrective control signals, each of said processors having an operating mode which is user defined, and a means for coordinating the operation of said processors.

16. A controller as described in claim i wherein the controller units comprise:

a reference processor having a reference input for receiving a reference signal, indicative of a user controlled setpoint, said reference processor generating a sequence of baseline control signals which can bring said plant into a desired state as indicated by an output signal from said plant, along a definite user defined path, a feedforward path model having an input which also receives said reference signal, to generate and output a sequence of signals representing the expected output of said plant at any instant along said user defined path, a disturbance processor having an input for receiving a sequence of error signals which represent the difference between the actual and the predicted plant output and for generating and outputting a sequence of corrective control signals based on a control law, a feedback loop model having an input for receiving a sequence of error signals representing the difference between the actual and predicted plant output said model generating an output of a sequence of signals representing disturbances that the disturbance processor has already processed, a reference model summation unit having inputs to receive the output sequences from the feedback loop model and the feedforward path model as well as a sequence representing the difference between the expected interference and the interference that is present in the plant, and an output means for producing an output sequence consisting of the element wise summation of the three input sequences, a disturbance processor summation unit having an input to receive a sequence of signals from the reference model summation unit and an input to receive the output from the plant, and an output means to produce an output sequence consisting of the difference between the first term of the sequence and the plant output, a reference processor summation unit having an input to receive the output sequence from the reference processor and the disturbance processor and an output for producing an output sequence consisting of the element wise summation of the two input sequences, one or more interference models containing a model of the plant under control each said model having inputs to receive a sequence of control signals from other controller units and each said model generating a sequence of output signals representing the effect each input sequence has on the plant under control, an interference model summation unit having input means to receive the plant control sequence from one or more interference models and output means for outputting a sequence consisting of the element wise summation of the two input sequences, an interference processor having an inputs for receiving a sequence of signals representing the difference between the expected interference and the interference that is present in the plant said interference processor generating an output of a sequence of corrective control signals, an interference predictor having input means to receive a sequence of signals from the interference processor and generating a sequence of signals representing the interference signals the interference processor has already generated corrective signals for, an interference predictor summation unit having input means to receive the output sequence from the interference model summation means and the output sequence from the interference predictor and output means for outputting a sequence consisting of the element wise summation of the two input sequence, an interference processor summation unit having inputs to receive the output sequence from the reference processor summation means and the interference processor and output means for outputting a plant control sequence in which the output is the element wise summation of the two input sequences, wherein said feedback loop model and said disturbance processor obtain their inputs from the disturbance processor summation unit and where said reference model summation unit and said interference processor unit obtain input from said interference predictor unit.

17. A controller unit according to claim 14 wherein said interference processor summation means reduces each term of the output sequence by the same proportion when one or more of the elements exceeds a user defined limit.

18. A controller unit according to claim 14 wherein said reference processor summation means reduces each term of the disturbance processor output sequence by the same proportion when one or more of the elements added with the reference processor sequence would exceed a user defined limit.

19. A controller unit according to claim 14 wherein said interference processor summation means reduces each term of the interference processor output sequence by the same proportion when one or more of the elements added with the reference processor summation means output sequence would exceed a user defined limit.

20. A method for controlling a plant comprising the steps of:
   (A) first:
      (i) defining a reference model which identifies the process under control, and
      (ii) selecting a user defined control law for the reference processor, disturbance processor and interference processor or a global law for all,
      (iii) selecting the inputs to the interference processor,
   (B) then in any order:
      (i) allowing the user to adjust the setpoint,
      (ii) generating a baseline reference control signal ($U_R$) thru a processor means obeying said control law,
      (iii) generating a disturbance corrective signal ($U_D$) through a processor means based on the deviation between the output from the plant and the expected output as generated by the reference model, but not including disturbances which have already had a corrective signal generated for them,
      (iv) generating an interference corrective signal ($U_I$) through a processor means based on the effect the other controllers have on the process under control, but not including outputs that have already had a corrective signal generated for them.
      (v) then combining $U_R$, $U_D$ and $U_I$ to produce a control signal for said plant so that the control law(s) are not violated,
   (C) then delivering the control signal to said plant to bring it into control.

* * * * *